US010956599B2

United States Patent
Kataoka et al.

(10) Patent No.: US 10,956,599 B2
(45) Date of Patent: Mar. 23, 2021

(54) NON-TRANSITORY COMPUTER READABLE RECORDING MEDIUM, ALTERATION DETECTION METHOD, AND ALTERATION DETECTION APPARATUS

(71) Applicant: FUJITSU LIMITED, Kawasaki (JP)

(72) Inventors: Masahiro Kataoka, Kamakura (JP); Gensai Hideshima, Nishinomiya (JP); Yasuhiro Suzuki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 232 days.

(21) Appl. No.: 16/171,873

(22) Filed: Oct. 26, 2018

(65) Prior Publication Data

US 2019/0130126 A1    May 2, 2019

(30) Foreign Application Priority Data

Oct. 31, 2017   (JP) .............................. JP2017-211285

(51) Int. Cl.
| | |
|---|---|
| G06F 21/62 | (2013.01) |
| H04L 9/32 | (2006.01) |
| G06F 21/64 | (2013.01) |
| H04L 9/06 | (2006.01) |
| G06F 40/123 | (2020.01) |
| G06F 40/194 | (2020.01) |
| G06F 40/242 | (2020.01) |

(52) U.S. Cl.
CPC .......... *G06F 21/6227* (2013.01); *G06F 21/64* (2013.01); *G06F 40/123* (2020.01); *G06F 40/194* (2020.01); *G06F 40/242* (2020.01); *H04L 9/0643* (2013.01); *H04L 9/3236* (2013.01); *H04L 9/3239* (2013.01)

(58) Field of Classification Search
CPC ........................... G06F 21/6227; G06F 40/194
USPC ............................................................ 726/26
See application file for complete search history.

(56) References Cited

U.S. PATENT DOCUMENTS

| | | | | |
|---|---|---|---|---|
| 2003/0131240 | A1* | 7/2003 | Greene | ................. H04L 9/3247 713/176 |
| 2007/0005977 | A1* | 1/2007 | Tohne | ................ H04N 1/32224 713/176 |
| 2007/0033235 | A1* | 2/2007 | Kato | ...................... G06F 3/0637 |
| 2014/0185933 | A1* | 7/2014 | Tian | ................... G06K 9/00456 382/173 |
| 2018/0361778 | A1* | 12/2018 | Dorier | .................. B42D 25/405 |

FOREIGN PATENT DOCUMENTS

| | | |
|---|---|---|
| JP | 2007-052698 | 3/2007 |
| JP | 2013-125445 | 6/2013 |

\* cited by examiner

*Primary Examiner* — Jacob Lipman
(74) *Attorney, Agent, or Firm* — Fujitsu Patent Center

(57) ABSTRACT

An alteration detection apparatus generates index information based on a document in a storage. The alteration detection apparatus acquires index information that is associated with information identifying a document. The alteration detection apparatus determines whether there is an alteration added to the acquired document based on a result of comparison between the generated index information and the acquired index information. The alteration detection apparatus detects, when there is an alteration, an altered part in the acquired document based on the result of comparison between the generated index information and the acquired index information.

12 Claims, 8 Drawing Sheets

FIG.1
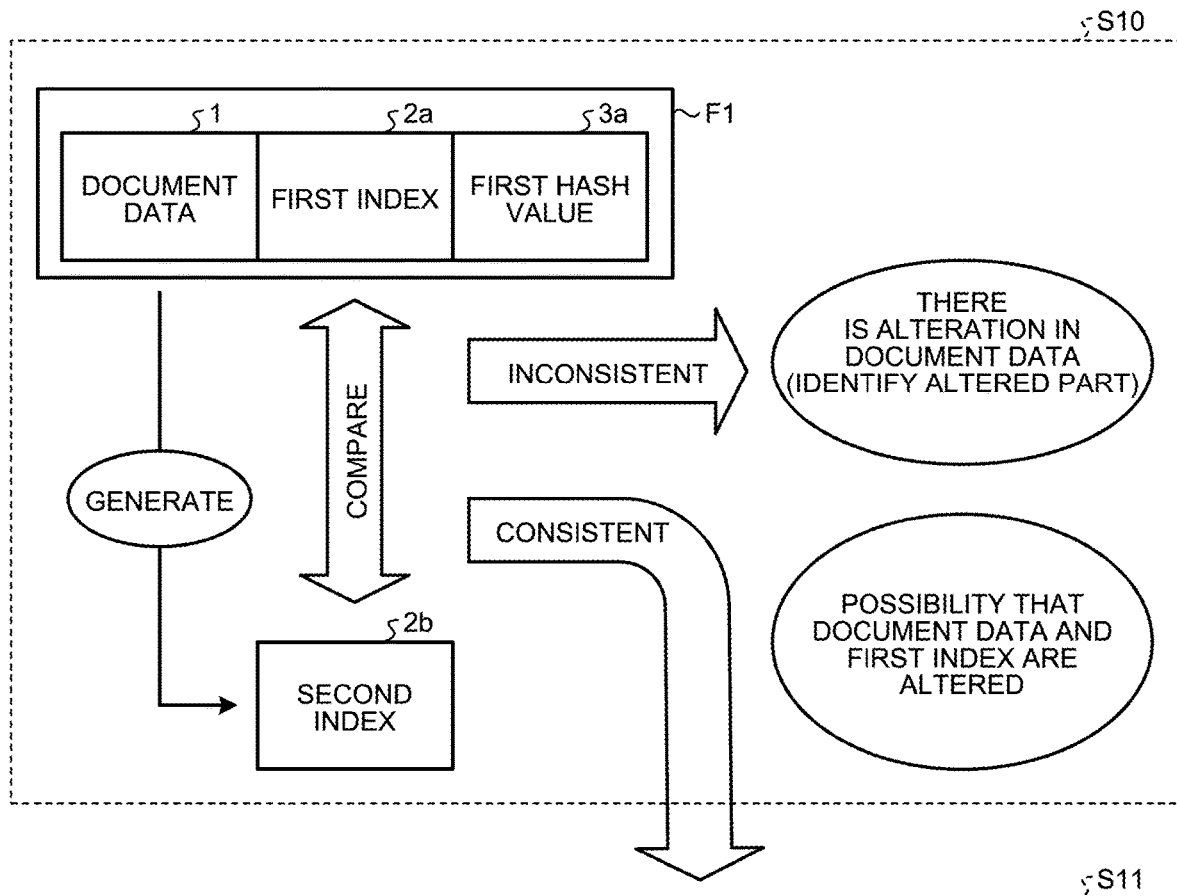
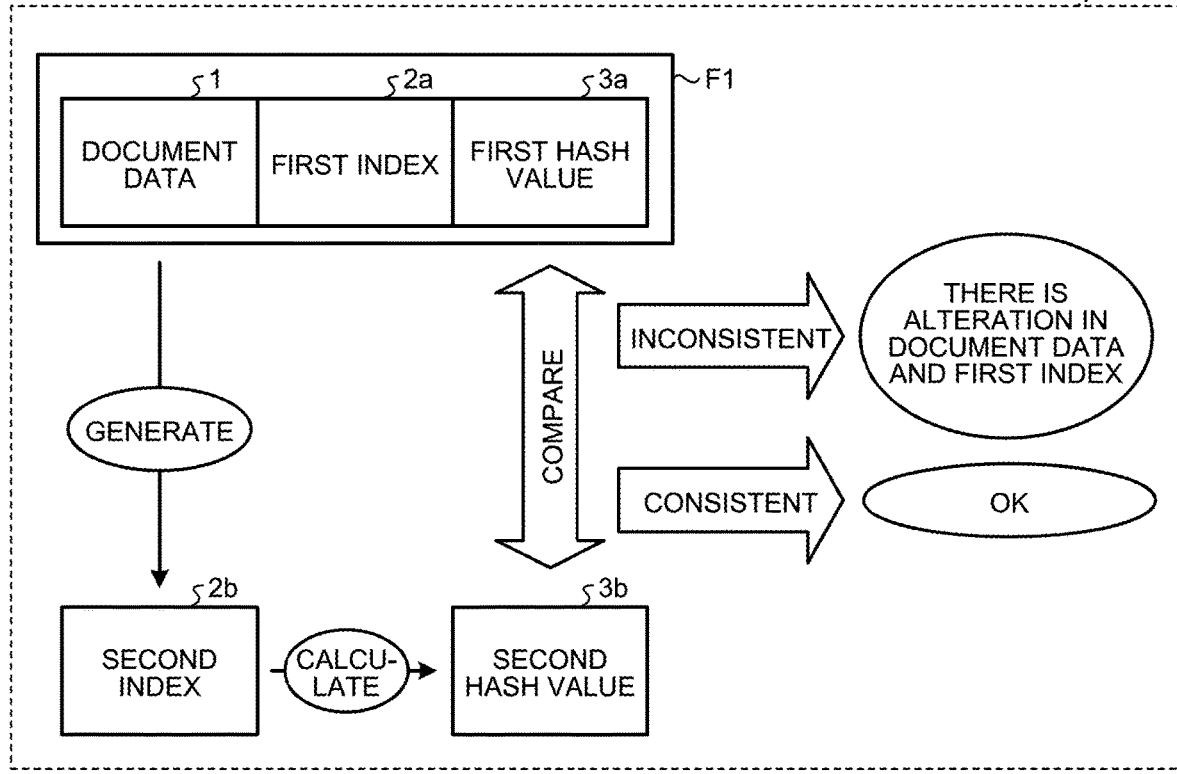

NON-TRANSITORY COMPUTER READABLE RECORDING MEDIUM, ALTERATION DETECTION METHOD, AND ALTERATION DETECTION APPARATUS

CROSS-REFERENCE TO RELATED APPLICATION(S)

This application is based upon and claims the benefit of priority of the prior Japanese Patent Application No. 2017-211285, filed on Oct. 31, 2017, the entire contents of which are incorporated herein by reference.

FIELD

The embodiment discussed herein is related to an alteration detection program, and the like.

BACKGROUND

Hash functions have conventionally been used to determine whether there is an alteration in a document subject to verification. For example, in a conventional technique, a hash value of an entire original document and a hash value of an entire document to be verified are compared, and it is determined that there is an alteration in a part of the document subject to verification when the hash values differ from each other. Moreover, in a conventional technique, after determining that there is an alteration in a document, processing to identify an altered part in the altered document is performed (Japanese Laid-open Patent Publication Nos. 2007-052698 and 2013-125445).

SUMMARY

According to an aspect of an embodiment, a non-transitory computer readable recording medium has stored therein a program that causes a computer to execute a process including: acquiring a document stored in a storage; generating index information in which an appearance position of information of any one of a word, a character, and a code included in the document is associated with the information based on the acquired document; acquiring index information that is associated with information identifying the acquired document from the storage; determining whether there is an alteration in the acquired document based on a result of comparison between the generated index information and the acquired index information; and detecting, when there is an alteration, a part of the alteration in the acquired document based on the result of comparison between the generated index information and the acquired index information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram for explaining processing performed by an alteration detection apparatus according to a present embodiment;

DESCRIPTION OF EMBODIMENT(S)

Figure 2:
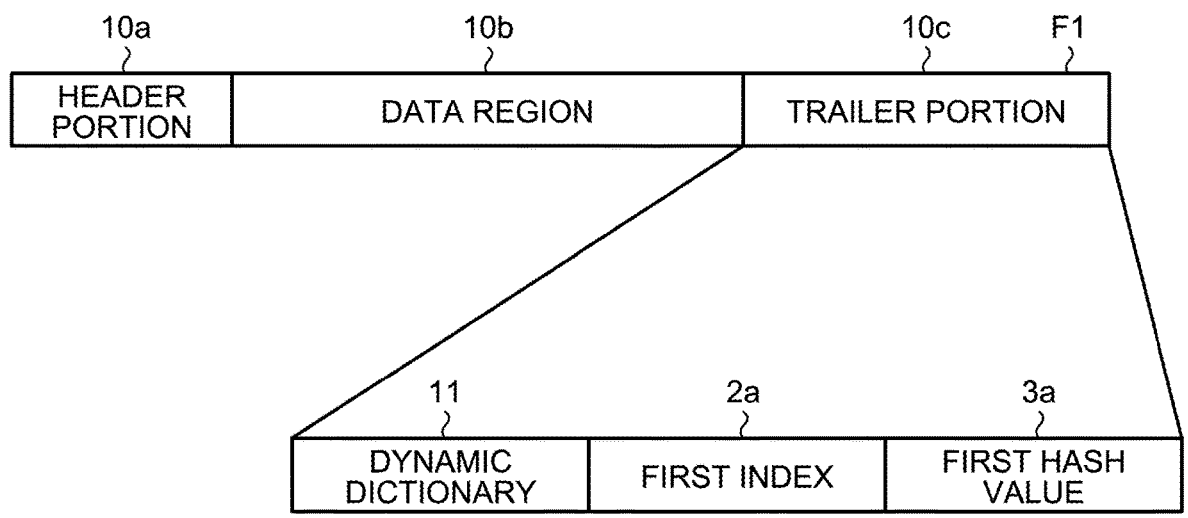
FIG. 2 is a diagram illustrating an example of a data structure of a file according to the present embodiment.

However, the conventional techniques described above have a problem that detection of whether there is an alteration, and of a part of an alteration is not performed without calculation using a hash function or the like performed on an entire document.

If a hash function is used for an entire document as in the conventional techniques, a computer executes calculation according to the size of the document. Furthermore, when it is determined that there is an alteration by comparison of hash values, another procedure is to be taken to identify a part of alteration, resulting in an increased calculation cost.

With conventional inverted indexes, processing to exclude stop words is performed to suppress the size of the inverted indexes. Therefore, inconsistency does not necessarily occur between the document and the inverted index even if a document has been altered, and an alteration is not always detected without fail.

Preferred embodiments of the present invention will be explained with reference to accompanying drawings. The embodiment is not intended to limit the present invention.

FIG. 1 is a diagram for explaining processing performed by the alteration detection apparatus according to the present embodiment. It is assumed that a first external device generates a file F1, and transmits it to a second external device through a network. For example, the alteration detection apparatus acquires the file F1 before it is delivered to the second external device, and determines whether an any alteration (manipulation) is added to the file F1. Illustration of the first external device and the second external device is omitted. For example, even if the file F1 has not been manipulated at the time when the alteration detection apparatus receives the file F1 from the first external device, it can be manipulated by malware or the like while the alteration detection apparatus hold the file F1.

As illustrated in FIG. 1, the file F1 acquired by the alteration detection apparatus from the second external device includes document data 1, a first index 2a, and a first hash value 3a.

The document data 1 is data of a document constituted of multiple character strings (words).

The first index 2a is an inverted index in which a code when the document data 1 is encoded and an appearance position of the code are associated.

When receiving the file F1, the alteration detection apparatus generates the first index 2a and the first hash value 3a. An example of processing of generating the first index 2a performed by the alteration detection apparatus is explained. The alteration detection apparatus encodes the document data 1 by a predetermined encoding method to generate encoded data. For example, the predetermined encoding method is such a method that encoding is done in a word unit using a static dictionary and a dynamic dictionary. The static dictionary is information in which words with high appearance frequency and codes are associated with each other. When a word to be encoded is included in the static dictionary, the alteration detection apparatus encodes the word from a relationship between a code registered in the static dictionary and the word.

On the other hand, when a word to be encoded is not included in the static dictionary, the alternation detection apparatus registers the word in the dynamic dictionary to assign a dynamic code thereto, and thereby encodes the word. For example, the dynamic code is assigned according to an appearance of a word.

The alteration detection apparatus scans the encoded data of the document data 1, and associates codes and appearance positions with each other to generate the first index $2a$. The alteration detection apparatus calculates the first index $2a$ in advance.

The first hash value $3a$ is a hash value that is calculated by inputting the first index $2a$ into a predetermined hash function. For example, the predetermined hash function corresponds to a hash function such as Message Digest Algorithm 5 (MD5). The first hash value $3a$ is calculated by the alteration detection apparatus in advance (at the time of reception of the file F1).

Subsequently, an example of processing at the time of alteration detection by the alteration detection apparatus is explained. For example, the alteration detection apparatus can perform the processing of alteration detection at the time when transmitting the file F1 to the second external device, or the like. First, the alteration detection apparatus performs processing at step S10. The alteration detection apparatus newly generates a second index $2b$ based on the document data 1 included in the file F1. The processing of newly generating the second index $2b$ by the alteration detection apparatus is performed at different timing from the timing when the first index $2a$ and the first hash value $3a$ are generated. For example, the alteration detection apparatus encodes the document data 1 by a predetermined encoding method, thereby generating encoded data, and generates the second index (inverted index) $2b$ in which a code included in the encoded data and an appearance position is associated with each other.

The alteration detection apparatus compares the first index $2a$ (the index calculated in advance) included in the file F1 and the second index $2b$ newly calculated. The alteration detection apparatus determines that the encoded data (the document data 1) has been altered when the first index $2a$ and the second index $2b$ are "inconsistent" because it means that a code in the first index $2a$ and a position of the code are not corresponding to the encoded data. Moreover, based on an inconsistent part between the first index $2a$ and the second index $2b$, the alteration detection apparatus determines an altered part in the document data 1. Furthermore, the second index $2b$ is generated for encoded data similar to that encoded by the encoding method used when the first index $2a$ is generated.

The alteration detection apparatus shifts to processing at step S11 when it is determined, at step S10, that the first index $2a$ and the second index $2b$ are "consistent". This is because an alteration is not detected by comparison of the first index $2a$ and the second index $2b$, for example, when the document data 1 is altered and the first index $2a$ is also altered along with the altered document data 1.

The processing at step S11 is explained. The alteration detection apparatus inputs the second index $2b$ into the predetermined hash function, to calculate a second hash value $3b$. The predetermined hash function used by the alteration detection apparatus is the same hash function used when the alteration detection apparatus calculates the first hash value $3a$.

The alteration detection apparatus compares the first hash value $3a$ and the second hash value $3b$. When the first hash value $3a$ and the second hash value $3b$ are "inconsistent", the alteration detection apparatus determines that the document data 1 and the first index $2a$ have been altered. On the other hand, when the first hash value $3a$ and the second hash value $3b$ are "consistent", the alteration detection apparatus determines that the document data 1 is not altered.

As described above, the alteration detection apparatus identifies whether there is an alteration in the document data 1, and an altered part based on a result of comparison between the first index $2a$ and the second index $2b$. Therefore, whether an alteration has been added can be detected and, further, an altered part can be detected without performing calculation of a hash value of the entire document data 1 as the conventional techniques. For example, manipulation of the document data 1 stored in the storage unit of the alteration detection apparatus by malware or the like can be detected.

Moreover, even when the first index $2a$ and the second index $2b$ are consistent, the following case is considered. That is, when the document data 1 is altered, and the first index $2a$ is also altered along with the altered document data 1, an alteration is not detected by comparison of the first index $2a$ and the second index $2b$. To cope with this problem, the alteration detection apparatus calculates the second hash value $3b$ based on the second index $2b$, and detects an alteration by comparison of the first hash value $3a$ and the second hash value $3b$. Because the second hash value $3b$ is not a hash value of the entire document data 1, but a hash value of the second index $2b$, alteration detection can be done while reducing the amount of calculation.

FIG. 2 is a diagram illustrating an example of a data structure of a file according to the present embodiment. As explained in FIG. 1, the file F1 is generated by the first external device, and transmitted to the second external device. As illustrated in FIG. 2, the file F1 includes a header portion $10a$, a data region $10b$, and a trailer portion $10c$. The header portion $10a$ includes information about appearance frequency of words included in document data, and the like. The data region $10b$ is a region in which the document data 1 is stored.

The trailer portion $10c$ includes a dynamic dictionary 11, the first index $2a$, and the first hash value $3a$. The dynamic dictionary 11 is a dictionary that is used when the document data 1 is encoded.

Figure 3:
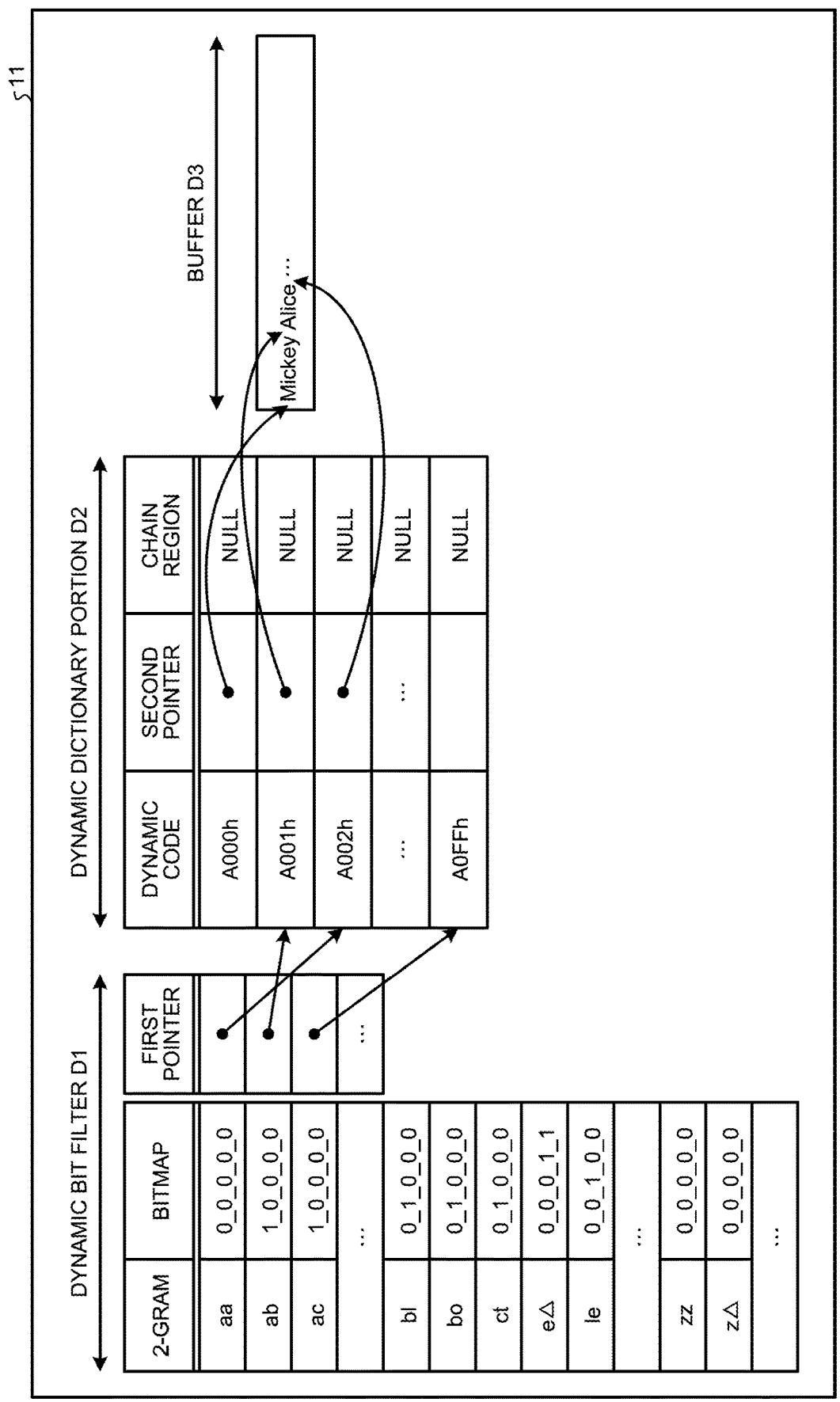
FIG. 3 is a diagram illustrating an example of a data structure of a dynamic dictionary according to the present embodiment.

FIG. 3 is a diagram illustrating one example of a data structure of the dynamic dictionary according to the present embodiment. As illustrated in FIG. 3, the dynamic dictionary 11 includes a dynamic bit filter D1, a dynamic dictionary portion D2, and a buffer D3.

The dynamic bit filter D1 includes a 2-gram, a bitmap, and a first pointer. The dynamic dictionary portion D2 associates a dynamic code, a second pointer, and a chain region with each other. The buffer D3 stores a word before encoding with the dynamic code.

The 2-gram of the dynamic bit filter D1 is information indicating a character string of two characters (or two words). The bitmap indicates a bitmap corresponding to the character string of the 2-gram. For example, a bitmap corresponding to "aa" is "0_0_0_0_0". The first pointer is a pointer indicating a position of a dynamic code corresponding to the bitmap.

For example, a word to be registered in the dynamic dictionary 11 is "ableΔ", bitmaps corresponding to 2-grams "ab", "bl", "le", "eΔ" are respectively combined. In each digit of bitmap, when all bitmap values are 0, a corresponding digit of combined bitmap is to be "0". On the other hand, when at least one "1" is included, a corresponding digit is to be "1". Thus, bitmaps are combined.

For example, suppose the bitmap of "ab" is "1_0_0_0_0", the bitmap of "bl" is "0_1_0_0_0", the bitmap of "le" is "0_0_1_0_0", and the bitmap of "eΔ" is "0_0_0_1_0". In this case, the bitmap obtained by combining the respective bitmaps is "1_1_1_1_0".

The dynamic code of the dynamic dictionary portion D2 is a code that is assigned to a word stored in the buffer D3. The second pointer is information indicating a position of the buffer D3 in which a word corresponding to the dynamic code are stored. For example, the second pointer corresponding to a dynamic code "A000h" indicates a starting position of "Mickey" stored in the buffer D3. That is, it indicates that the word "Mickey" is dynamic encoded to the dynamic code "A000h".

The chain region of the dynamic dictionary portion D2 is information indicating whether a corresponding character string or the like is linked from a pointer of the bit filter. When the corresponding character string is not linked, "NULL" is set in the chain region.

Figure 4:
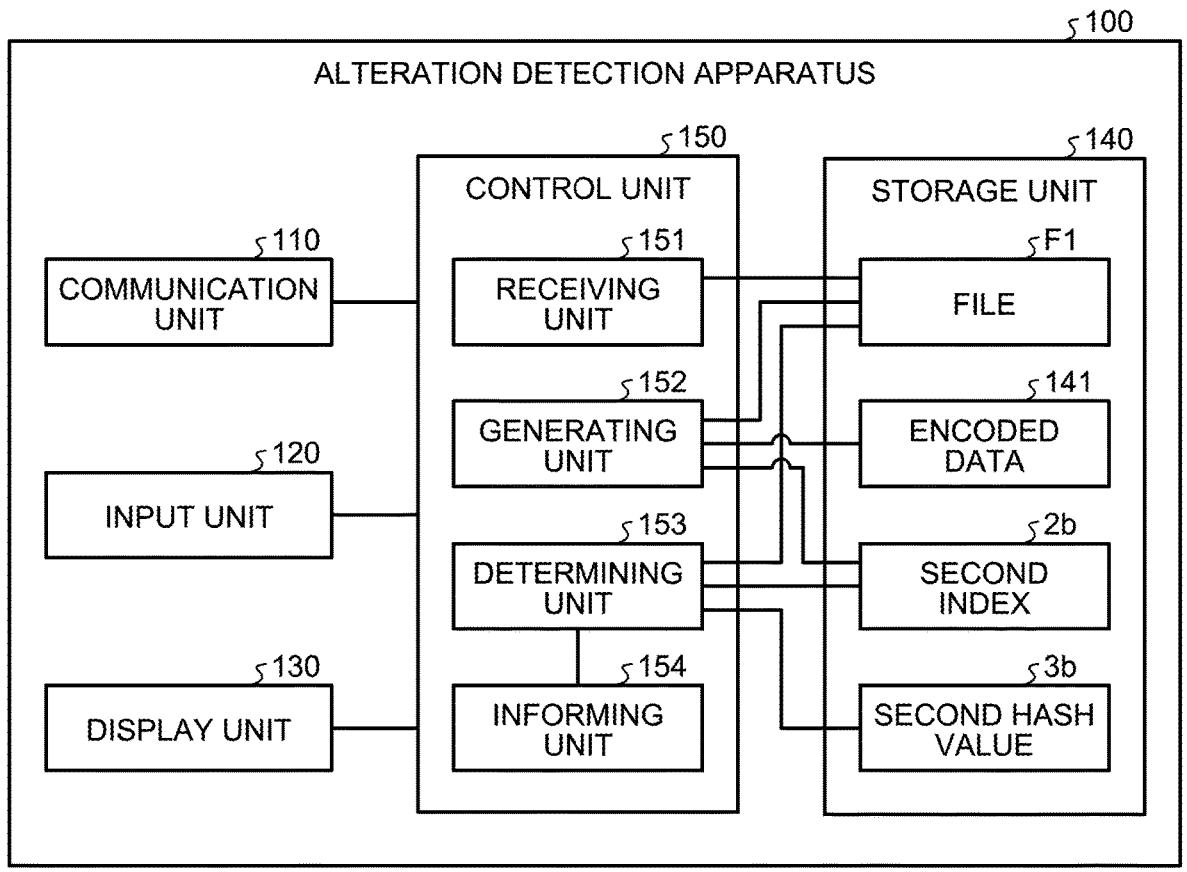
FIG. 4 is a functional block diagram illustrating a configuration of the alteration detection apparatus according to the present embodiment.

FIG. 4 is a functional block diagram illustrating a configuration of the alteration detection apparatus according to the present embodiment. As illustrated in FIG. 4, an alteration detection apparatus 100 includes a communication unit 110, an input unit 12, a display unit 130, a storage unit 140, and a control unit 150.

The communication unit 110 is a communication device that performs data communication with the first external device, the second external device, and other external devices through a network. The control unit 150 described later communicates data with the first external device, the second external device, and other external devices through the communication unit 110.

An input unit 120 is an input device to input various kinds of data to the alteration detection apparatus 100. The input unit 120 corresponds to, for example, an input device such as a keyboard, a mouse, and a touch panel.

The display unit 130 is a display device that displays data output from the control unit 150. The display unit 130 corresponds to a liquid crystal display panel, a touch panel, and the like.

The storage unit 140 has the file F1, encoded data 141, the second index 2b, and the second hash value 3b. The storage unit 140 corresponds to a semiconductor memory device, such as a random access memory (RAM), a read only memory (ROM), and a flash memory, a storage device such as a hard disk drive (HDD), and the like.

The file F1 is an encoded file that is generated by the first external device to be transmitted from the first external device to the second external device. Explanation about the file F1 is the same as the explanation about the file F1 given with FIG. 2.

The encoded data 141 is data that is generated by encoding the document data 1 by a predetermined encoding method by the alteration detection apparatus 100.

Figure 5:
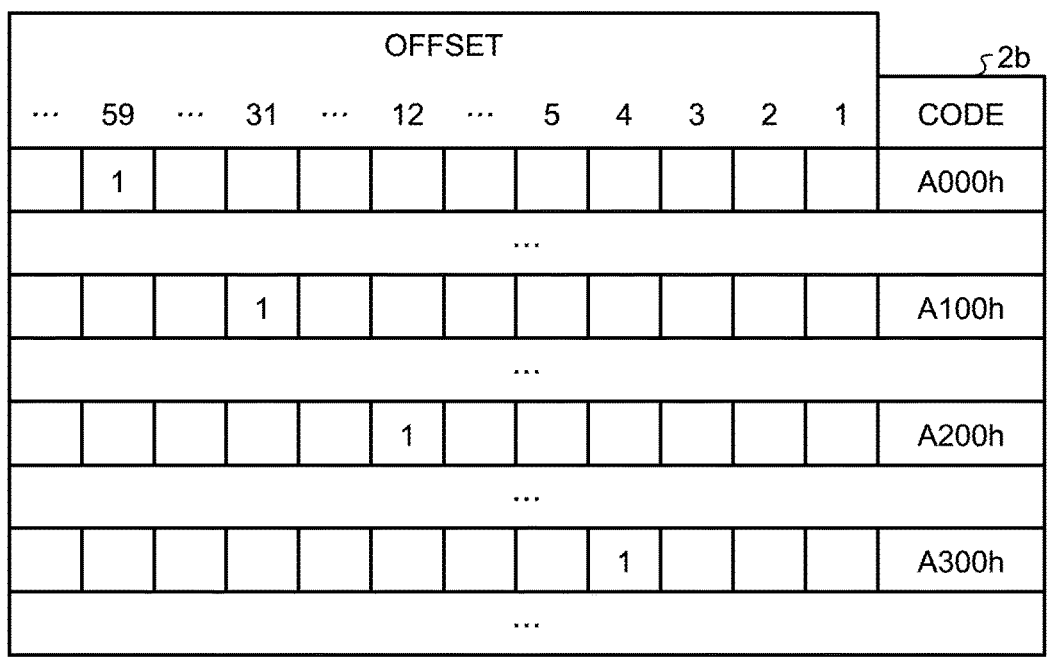
FIG. 5 is a diagram illustrating an example of a data structure of an index.

The second index 2b is an inverted index that is newly generated by the alteration detection apparatus 100 based on the encoded data 141 obtained by encoding the document data 1 of the file F1. FIG. 5 is a diagram illustrating an example of a data structure of an index. As the index, a data structure of the second index 2b is herein explained. Note that the first index 2a and the second index 2b are the same index if there is no alteration in the document data 1.

As illustrated in FIG. 5, the second index 2b associates a code included in the encoded data 141 and an offset. The code corresponds to a static code encoded by the static dictionary, or a dynamic code encoded by the dynamic dictionary 11. The offset indicates a position of a corresponding code in the encoded data 141.

The code "A000h" is explained as an example. In FIG. 5, a flag "1" corresponding to the code "A000h" is set at a position of an offset "59". Accordingly, it is indicated that the code "A000h" is a code positioned at the 59th from the top among the codes included in the encoded data 141. When counting the order, codes corresponding to one word are handled as one group.

The second hash value 3b is a hash value that is calculated by inputting the second index 2b into a predetermined hash function. The predetermined hash function is the same as the hash function used when calculating the first hash value 3a by the first external device.

Explanation returns to FIG. 4. The control unit 150 includes a receiving unit 151, a generating unit 152, a determining unit 153, an informing unit 154. The control unit 150 can be implemented by a central processing unit (CPU), a micro processing unit (MPU), or the like. Moreover, the control unit 150 can be implemented also by a hard wired logic, such as an application specific integrated circuit (ASIC) and a field programmable gate array (FPGA).

The receiving unit 151 is a processing unit that receives the file F1 as a subject to alteration detection. The receiving unit 151 stores the received file F1 in the storage unit 140.

The generating unit 152 is a processing unit that generates the encoded data 141 based on the document data 1 stored in the data region 10b of the file F1, and that generates the second index 2b based on the encoded data 141. The processing of calculating the first index 2a and the first hash value 3a by the generating unit 152 is the same as the processing of generating the second index 2b and the second hash value 3b described later. The generating unit 152 generates the first index 2a and the first hash value 3a prior thereto. Furthermore, the generating unit 152 preserves the document data 1 before subjected to encoding even when the first index 2a and the first hash value 3a are generated.

An example of processing of encoding the document data 1 by the generating unit 152 is explained. The generating unit 152 encodes the document data 1 by using the static dictionary and the dynamic dictionary 11. For example, the generating unit 152 compares a character string (word) of the document data 1 with words in the static dictionary, and as for a character string for which a hit is found in the static dictionary, performs the processing of replacing the character string with a code associated with the hit character string. Moreover, for a character string for which there is no hit in the static dictionary, the generating unit 152 compares the character string with the dynamic dictionary 11, and performs processing of replacing the character string with a dynamic code that corresponds to the character string registered in the dynamic dictionary 11. The generating unit 152 generates the encoded data 141 by performing the above processing.

Processing of generating the second index 2b based on the encoded data 141 by the generating unit 152 is explained. For example, the generating unit 152 scans the encoded data 141, and identifies a position (offset) of each code. The generating unit 152 generates the second index 2b by associating a code and an offset.

Figure 6:
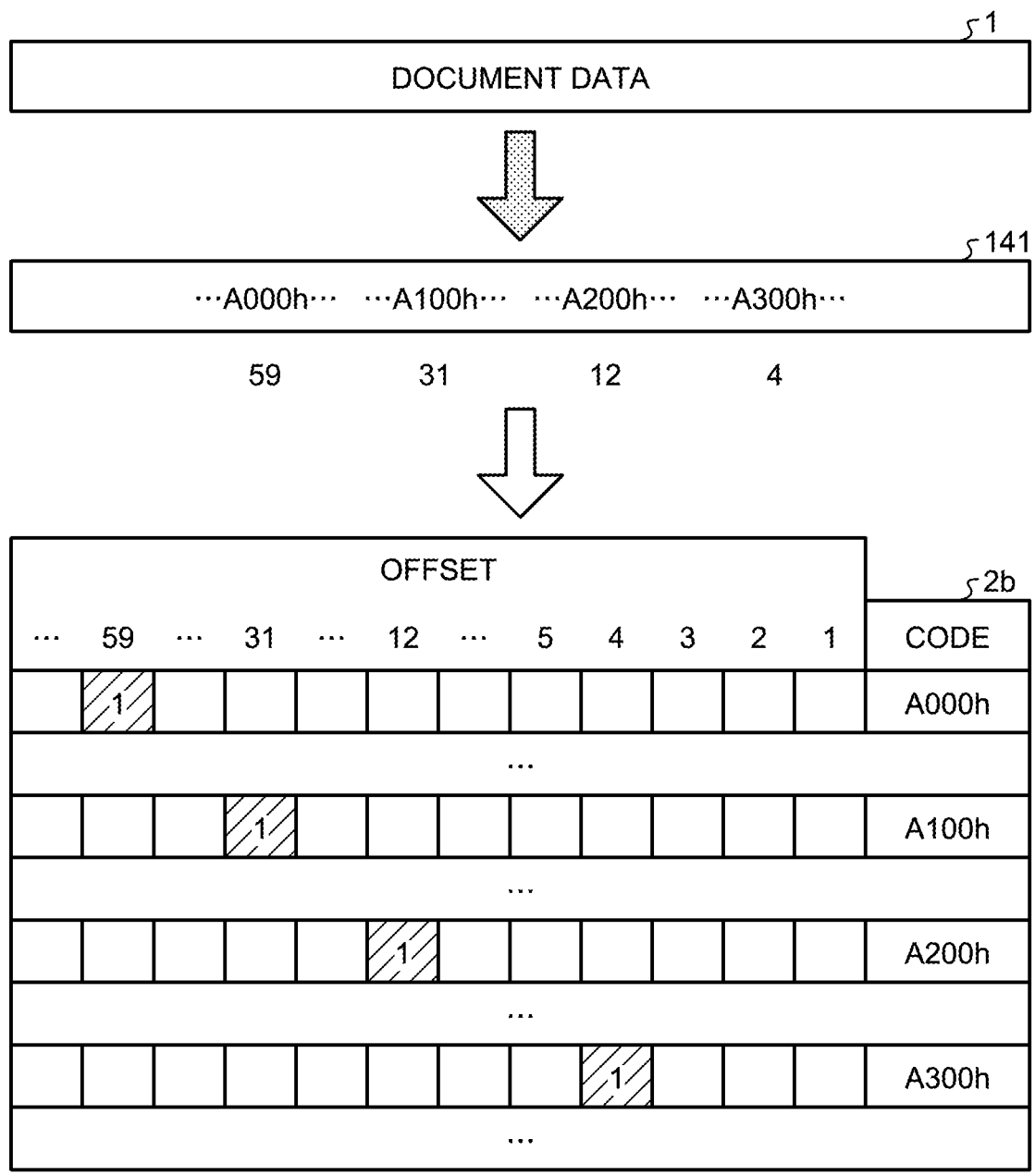
FIG. 6 is a diagram for explaining an example of processing of generating an index by a generating unit.

FIG. 6 is a diagram for explaining an example of processing of generating an index by the generating unit. In this example, the encoded data obtained by encoding the document data 1 is the encoded data 141 as an example. The generating unit 152 refers to the encoded data 141 and finds that the code "A000h" is positioned at the "59"-th, and a code "A100h" is positioned at the "31"-st. Moreover, it is found that a code "A200h" is positioned at the "12"-th, and a code "A300h" is positioned at the "4"-th.

In this case, the generating unit 152 registers the code "A000h" in the second index 2b, and sets the flag "1" to the offset "59" corresponding to this code "A000h". The generating unit 152 registers the code "A100h" in the second index 2b, and sets the flag "1" to the offset "31" corresponding to this code "A100h". The generating unit 152 registers the code "A200h" in the second index 2b, and sets the flag "1" to the offset "12" corresponding to this code "A200h". The generating unit 152 registers the code "A300h" in the second index 2b, and sets the flag "1" to the offset "12" corresponding to this code "A300h".

The determining unit 153 is a processing unit that compares the first index 2a and the second index 2b to determine whether there is an alteration in the document data 1 and an altered point. The determining unit 153 outputs a result of determination to the informing unit 154. In the following, first processing and second processing performed by the determining unit 153 are explained.

The first processing performed by the determining unit 153 is explained. The determining unit 153 acquires the first index 2a stored in the trailer portion 10c of the file F1. The determining unit 153 compares the acquired first index 2a and the second index 2b.

Figure 7:
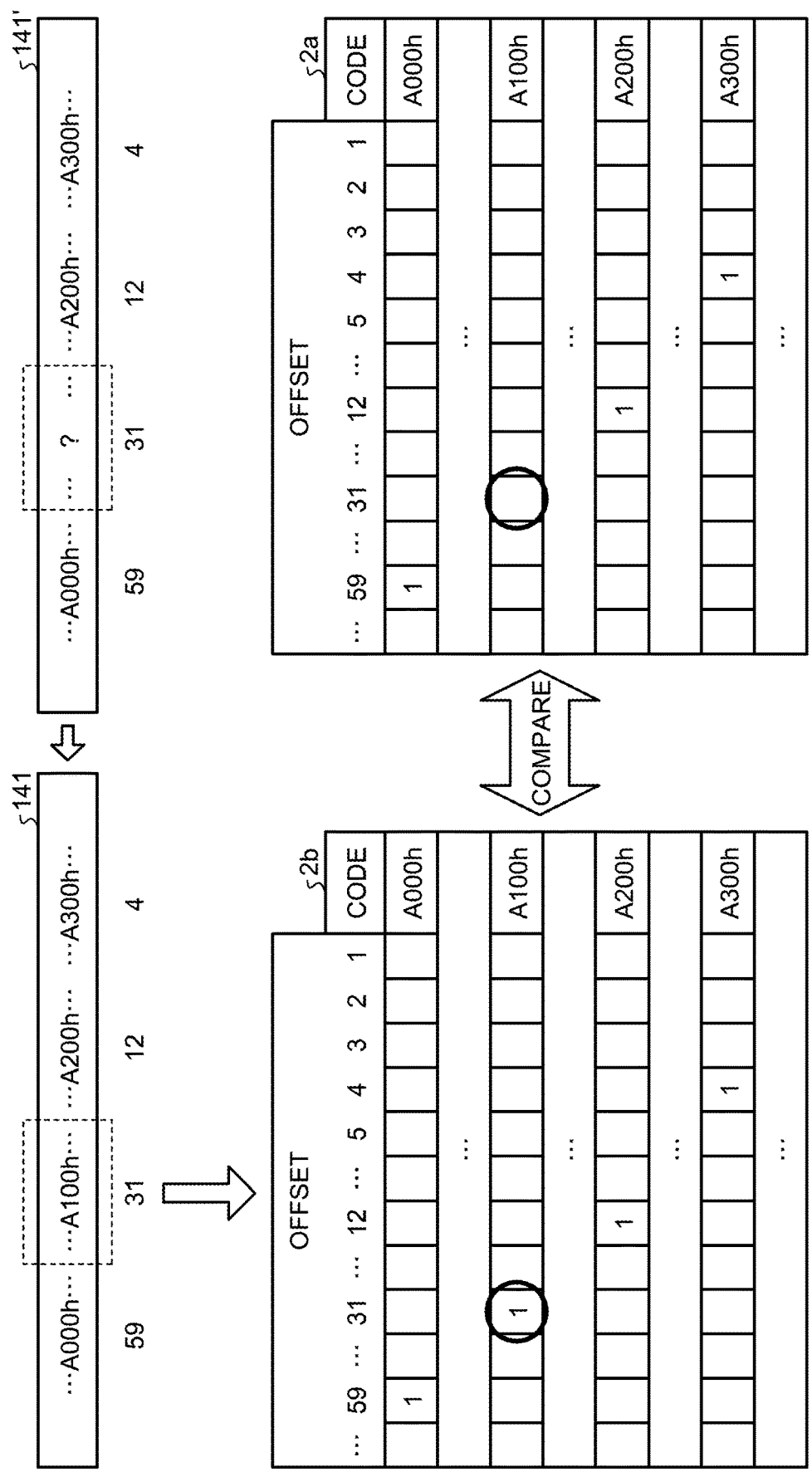
FIG. 7 is a diagram for explaining processing performed by a determining unit.

FIG. 7 is a diagram for explaining processing performed by the determining unit. In the example illustrated in FIG. 7, by comparing the first index 2a and the second index 2b, it is found that the first index 2a and the second index 2b are "inconsistent". Specifically, while the flag "1" is set to the offset "31" of the code "A100h" in the second index 2b, no flag is set to the offset "31" of the code "A100h" in the first index 2a. Therefore, the determining unit 153 determines that the encoded data 141 has been "altered". Specifically, it is determined that a code that has been assigned to the offset "31" in encoded data 141' before alteration has been changed to "A100h".

Furthermore, the determining unit 153 detects an altered part of the document data 1 based on a position of the offset to which a change is added. For example, the determining unit 153 compares the document data 1 and the encoded data 141 to identify a position of a character string corresponding to the code at the position of the offset to which a change is added in the document data 1, and detects it as the altered part.

On the other hand, the determining unit 153 proceeds to the second processing when the first index 2a and the second index 2b are "consistent".

The second processing performed by the determining unit 153 is explained. The determining unit 153 acquires the first hash value 3a stored in the trailer portion 10c of the file F1. Moreover, the determining unit 153 calculates the second hash value 3b by inputting the second index 2b to a predetermined hash function, and store it in the storage unit 140.

The determining unit 153 compares the first hash value 3a and the second hash value 3b, and determines that the document data 1 has not been altered when the first hash value 3a and the second hash value 3b are "consistent". On the other hand, the determining unit 153 determines that the document data 1 and the first index 2a have been altered when the first hash value 3a and the second hash value 3b are "inconsistent".

The informing unit 154 is a processing unit that causes the display unit 130 to display a result of determination by the determining unit 153. The informing unit 154 can inform the result of determination by the determining unit 153 to the second external device.

Figure 8:
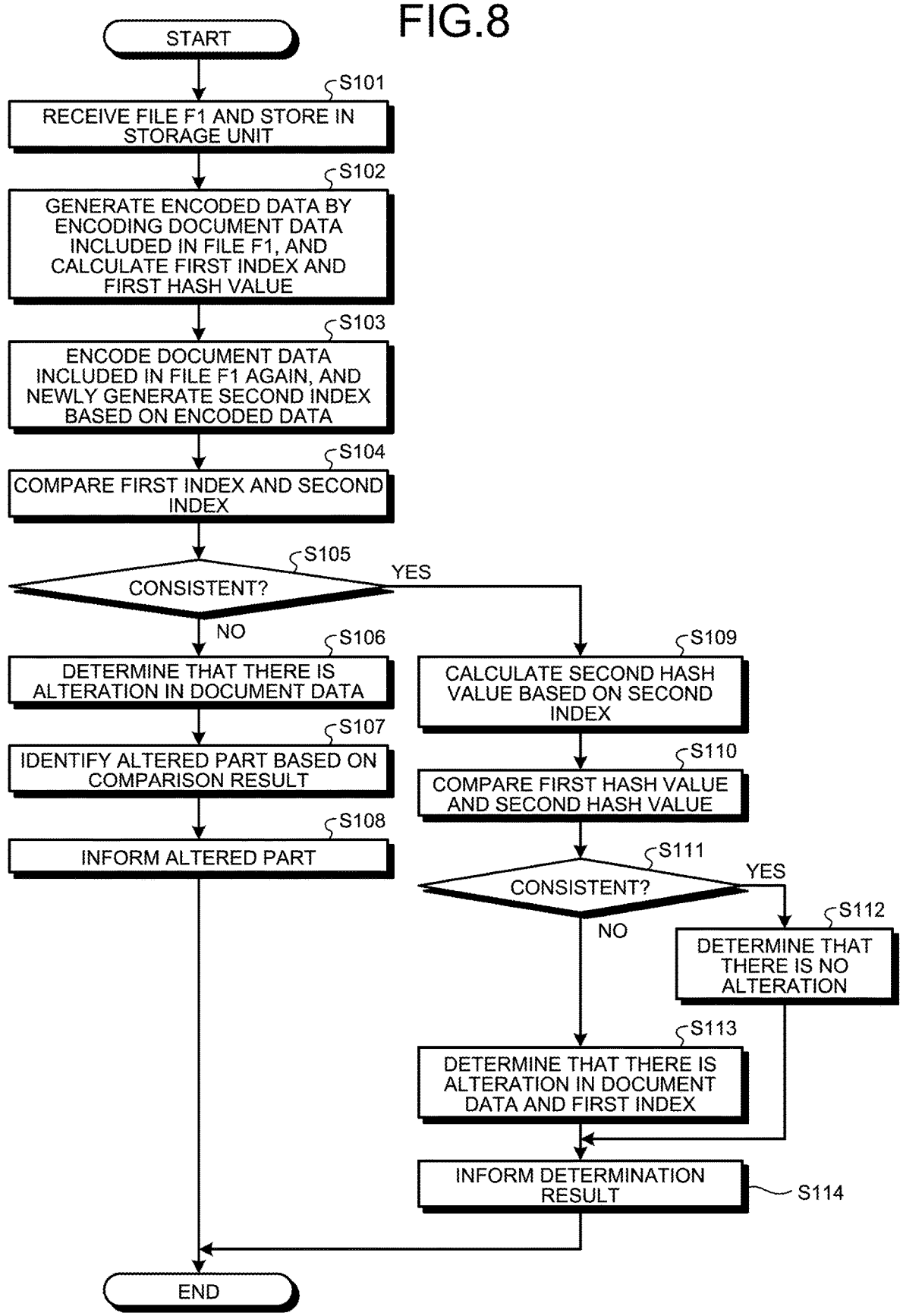
FIG. 8 is a flowchart illustrating a procedure of processing performed by the alteration detection apparatus according to the present embodiment.

Next, a procedure of processing performed by the alteration detection apparatus 100 according to the present embodiment is explained. FIG. 8 is a flowchart illustrating a procedure of the processing performed by the alteration detection apparatus according to the present embodiment. As illustrated in FIG. 8, the receiving unit 151 of the alteration detection apparatus 100 receives the file F1 from the second external device, and stores the file F1 in the storage unit 140 (step S101).

The generating unit 152 of the alteration detection apparatus 100 generates the encoded data 141 by encoding the document data 1 included in the file F1, and calculates the first index 2a and the first hash value 3a (step S102). The generating unit 152 encodes the document data included in the file F1 again based on the encoded data 141, to newly generate the second index 2b (step S103). For example, the generating unit 152 performs processing at step S103 and later at the time when transmitting information of the file F1 to the second external device.

The determining unit 153 of the alteration detection apparatus 100 compares the first index 2a and the second index 2b (step S104). When the first index 2a and the second index 2b are consistent (step S105: YES), the determining unit 153 proceeds to step S109. When the first index 2a and the second index 2b are inconsistent (step S105: NO), the determining unit 153 proceeds to step S106.

The determining unit 153 determines that there is an alteration in the document data 1 (step S106). The determining unit 153 identifies an altered part based on the result of comparison (step S107). The informing unit 154 of the alteration detection apparatus 100 informs about the altered part (step S108).

The determining unit 153 calculates the second hash value 3b based on the second index 2b (step S109). The determining unit 153 compares the first hash value 3a and the second hash value 3b (step S110). When the first hash value 3a and the second hash value 3b are consistent (step S111: YES), the determining unit 153 determines that there is no alteration (step S112), and proceeds to step S114.

On the other hand, when the first hash value 3a and the second hash value 3b are inconsistent (step S111: NO), the determining unit 153 determines that the document data 1 and the first index 2a have been changed (step S113). The informing unit 154 informs about the result of determination (step S114).

Next, effects of the alteration detection apparatus 100 according to the present embodiment are explained. When determining whether the document data 1 has been altered, the alteration detection apparatus 100 generates the second index 2b from the encoded data 141 obtained by encoding the document data 1, and determines whether the document data 1 has been altered based on the result of comparison between the first index 2a and the second index 2b. Therefore, whether there is an alteration can be determined without calculating a hash value of the entire document data 1 as in the conventional techniques.

Moreover, the first index 2a and the second index 2b include information about a position of each code included in the encoded data 141 that is obtained by encoding the document data 1. Therefore, the alteration detection apparatus 100 can determine whether there is an alteration and an altered part by comparing the first index 2a and the second index 2b, without calculating a hash value of the entire document data 1.

Note that there is a following case even when the first index 2a and the second index 2b are consistent. That is, when the document data 1 is altered, and the first index 2a is also altered along with the encoded data 141 corresponding to the altered document data 1, an alteration is not detected by comparison of the first index 2a and the second index 2b. To cope with this problem, the alteration detection apparatus 100 calculates the second hash value 3b based on the second index 2b, and compares the first hash value 3a and the second hash value 3b, thereby detecting an alteration. The second hash value 3b is not a hash value of the entire document data 1, but a hash value of the second index 2b. Therefore, an alteration can be detected while reducing an amount of calculation.

The alteration detection apparatus 100 can be informed of information of the dynamic dictionary 11 stored in the trailer portion 10c of the file F1 when the first external device generates the file F1. The alteration detection apparatus 100 can further determine whether there is an alteration in the dynamic dictionary 11 by comparing the information of the dynamic dictionary 11 stored in the trailer portion 10c of the file F1 that is acquired from the second external device with information of the dynamic dictionary 11 that has been received from the first external device. By performing the above processing, the alteration detection apparatus 100 can detect manipulations of the dynamic dictionary efficiently.

Figure 9:
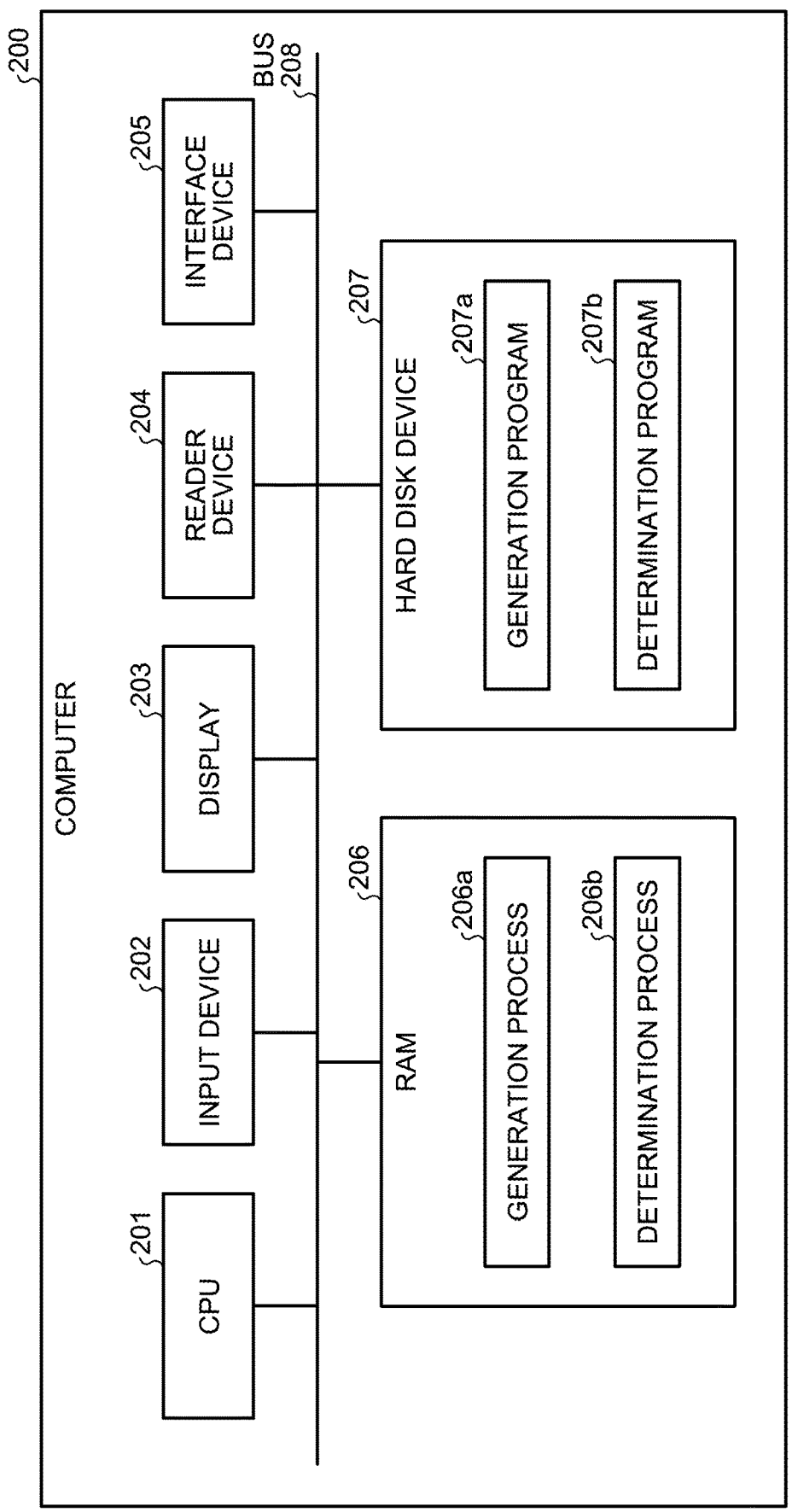
FIG. 9 is a diagram illustrating an example of a hardware configuration of a computer that implements functions similar to those of the alteration detection apparatus.

Next, an example of a hardware configuration of a computer that implements functions similar to those of the alteration detection apparatus 100 described in the above embodiment is explained. FIG. 9 is a diagram illustrating an example of a hardware configuration of a computer that implements the functions similar to those of the alteration detection apparatus.

As illustrated in FIG. 9, a computer 200 includes a CPU 201 that executes various kinds of arithmetic processing, an input device 202 that accepts an input of data from a user, and a display 203. Furthermore, the computer 200 a reader device 204 that reads a program and the like from a recording medium, and an interface device 205 that communicates data with other computers through a network. Moreover, the computer 200 includes a RAM 206 that temporarily stores various kinds of information, and a hard disk device 207. The respective devices 201 to 207 are connected to a bus 208.

The hard disk device 207 has a generation program 207a and a determination program 207b. The CPU 201 reads the generation program 207a and the determination program 207b to develop in the RAM 206.

The generation program 207a functions as a generation process 206a. The determination program 207b functions as a determination process 206b. Processing of the generation process 206a corresponds to the processing of the generating unit 152. Processing of the determination process 206b corresponds to the processing of the determining unit 153.

The respective programs 207a, 207b are not necessarily be stored in the hard disk device 207 from the beginning. For example, the respective programs are stored in a "portable physical medium", such as a flexible disk (FD), a compact disk (CD)-ROM, a digital versatile disk (DVD), a magneto-optical disk, and an integrated circuit (IC) card, that is inserted into the computer 200. It can be arranged such that the computer 200 or the like reads the respective programs 207a, 207b therefrom to execute them. Although the first index and the second index have been explained as inverted indexes in the embodiment, the present invention is not limited thereto. Instead of the inverted index, an index can be used.

Furthermore, although the alteration detection apparatus 100 generates the first index 2a and the first hash value 3a as an example in the present embodiment, it is not limited thereto, and the first external device can generate them. The alteration detection apparatus 100 generates the second index 2b when receiving the file F1 from the first external device and performs the processing of the alteration detection described above, thereby determining whether the file F1 has been altered while the file F1 is transmitted from the first external device to the alteration detection apparatus 100.

Detection of whether there is an alteration, and of an altered part can be achieved without calculation using a hash function of an entire document, and the like.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer readable recording medium having stored therein a program that causes a computer to execute a process comprising:
    storing a document and first index information in a storage wherein the document includes pieces of data, the first index information is generated from the document to indicate a position within the document, of a piece of data included in the document;
    acquiring the document and the first index information stored in the storage;
    generating from the acquired document second index information that indicates a position within the acquired document, of a piece of data included in the acquired document;
    determining whether there is an alteration in the pieces of data included in the acquired document based on a result of comparison between the first index information and the second index information; and
    outputting to a display unit or an external device, when determining that there is the alteration, a position that is where the alteration in the acquired document has occurred and indicated by the first index information and the second index information.

2. The non-transitory computer readable recording medium according to claim 1, wherein
    the storing includes calculating a first hash value of the first index information, and the determining includes calculating a second hash value of the second index information when the first index information and the second index information are equal one another, and determines whether there is the alteration based on a result of comparison between the first hash value and the second hash value.

3. The non-transitory computer readable recording medium according to claim 1, wherein
the first index information indicates a position within a first encoded document that is obtained by encoding the stored document, of a piece of data included in the first encoded document, and the second index information indicates a position within a second encoded document that is obtained by encoding the acquired document, a piece of data included in the second encoded document.

4. The non-transitory computer readable recording medium according to claim 3, wherein
the encoding the stored document includes using a dynamic dictionary, and the encoding the acquired document includes using a dynamic dictionary.

5. An alteration detection method comprising:
storing a document and first index information in a storage wherein the document includes pieces of data, the first index information is generated from the document to indicate a position within the document, of a piece of data included in the document, using a processor;
acquiring the document and the first index information stored in the storage, using the processor;
generating from the acquired document second index information that indicates a position within the acquired document, of a piece of data included in the acquired document, using the processor;
determining whether there is an alteration in the pieces of data included in the acquired document based on a result of comparison between the first index information and the second index information, using the processor; and
outputting to a display unit or an external device, when determining that there is the alteration, a position that is where the alteration in the acquired document has occurred and indicated by the first index information and the second index information, using the processor.

6. The alteration detection method according to claim 5, wherein
the storing includes calculating a first hash value of the first index information, and the determining includes calculating a second hash value of the second index information when the first index information and the second index information are equal one another, and determines whether there is the alteration based on a result of comparison between the first hash value and the second hash value.

7. The alteration detection method according to claim 5, wherein
the first index information indicates a position within a first encoded document that is obtained by encoding the stored document, of a piece of data included in the first encoded document, and the second index information indicates a position within a second encoded document that is obtained by encoding the acquired document, a piece of data included in the second encoded document.

8. The alteration detection method according to claim 7, wherein
the encoding the stored document includes using a dynamic dictionary, and the encoding the acquired document includes using a dynamic dictionary.

9. An alteration detection apparatus comprising:
a memory; and
a processor coupled to the memory, wherein the processor executes a process comprising:
storing a document and first index information in the memory wherein the document includes pieces of data, the first index information is generated from the document to indicate a position within the document, of a piece of data included in the document;
acquiring the document and the first index information stored in the memory;
generating from the acquired document second index information that indicates a position within the acquired document, of a piece of data included in the acquired document;
determining whether there is an alteration in the pieces of data included in the acquired document based on a result of comparison between the first index information and the second index information; and
outputting to a display unit or an external device, when determining that there is the alteration, a position that is where the alteration in the acquired document has occurred and indicated by the first index information and the second index information.

10. The alteration detection apparatus according to claim 9, wherein
the storing includes calculating a first hash value of the first index information, and the determining includes calculating a second hash value of the second index information when the first index information and the second index information are equal one another, and determines whether there is the alteration based on a result of comparison between the first hash value and the second hash value.

11. The alteration detection apparatus according to claim 9, wherein
the first index information indicates a position within a first encoded document that is obtained by encoding the stored document, of a piece of data included in the first encoded document, and the second index information indicates a position within a second encoded document that is obtained by encoding the acquired document, a piece of data included in the second encoded document.

12. The alteration detection apparatus according to claim 11, wherein
the encoding the stored document includes using a dynamic dictionary, and the encoding the acquired document includes using a dynamic dictionary.

* * * * *